United States Patent [19]

Schneider et al.

[11] 4,286,960
[45] Sep. 1, 1981

[54] DYESTUFF COMPOSITIONS CONTAINING ACYLATED ALKOXYLATES OF POLYHYDRIC ALIPHATIC ALCOHOLS

[75] Inventors: Manfred Schneider, Eppstein; Hubert Kruse, Kelkheim; Konrad Opitz, Liederbach; Siegfried Billenstein, Burgkirchen, all of Fed. Rep. of Germany

[73] Assignee: Hoechst Aktiengesellschaft, Fed. Rep. of Germany

[21] Appl. No.: 201,443

[22] Filed: Oct. 28, 1980

[30] Foreign Application Priority Data

Oct. 31, 1979 [DE] Fed. Rep. of Germany ....... 2943902

[51] Int. Cl.$^3$ ........................ D06P 67/00; C09B 67/00
[52] U.S. Cl. ............................................ 8/527; 8/471; 8/528; 8/582; 8/650
[58] Field of Search ............................ 8/527, 528, 582

[56] References Cited

U.S. PATENT DOCUMENTS

| | | | |
|---|---|---|---|
| 3,957,432 | 5/1976 | Kuryla | 8/527 |
| 3,989,452 | 11/1976 | Hugelshofer | 8/527 |
| 4,150,947 | 4/1979 | Lang et al. | 8/527 |
| 4,191,532 | 3/1980 | Gross et al. | 8/527 |

*Primary Examiner*—A. Lionel Clingman
*Attorney, Agent, or Firm*—Connolly and Hutz

[57] ABSTRACT

Water-soluble surface-active esters of di- to hexa-hydric aliphatic alcohols which have been reacted with propylene oxide and/or ethylene oxide and thereafter with at least two moles of a carboxylic acid of up to 22 carbon atoms are useful for dyestuff preparations. These preparations have good flow properties even with high dyestuff concentrations and low contents of said esters and optionally other surfactants and can be used in dyeing and printing procedures, especially in printing pastes for printing transfer sheets.

13 Claims, No Drawings

DYESTUFF COMPOSITIONS CONTAINING ACYLATED ALKOXYLATES OF POLYHYDRIC ALIPHATIC ALCOHOLS

The invention relates to the use of water-soluble compounds of the formula I $$A\left[-O-(X-O)_n-\right]_p^{H_m}(CO-R)_{p-m} \qquad I$$

in which A is an aliphatic or cycloaliphatic radical with 2 to 10 C atoms, the X's represent identical or different groups of the formulae $$-CH_2-CH_2-$$

and $$-CH_2-CH(CH_3)-,$$

the R's represent identical or different radicals of a carboxylic acid with up to 22 C atoms, the n's denote identical or different numbers from 8 to 150, m is a number from 0 to 4 and p is an integer from 2 to 6, p−m being at least 2, as agents for making dyestuff preparations.

It is preferred to use compounds of the formula I—which are termed "esterification products" in the text which follows—in which A is an alkylene radical with 2 to 6 C atoms, R is the radical of an alkanecarboxylic or alkenecarboxylic acid, the proportion of oxethyl groups in the radical X, based on the weight of the total molecule, is 40 to 95%, especially 60 to 90% and in particular 65 to 85% and the molecular weight is 3,000 to 40,000, especially 6,000 to 30,000 and in particular 7,000 to 14,000.

The esterification products to be used according to the invention can be prepared by esterifying the alkylene oxide adducts with the corresponding fatty acid or fatty acids, after the addition of a catalyst if necessary.

These esterification products are outstandingly suitable as agents for making up preparations of dyestuffs which are insoluble to sparingly soluble in water, especially vat dyestuffs and disperse dyestuffs, and enable highly concentrated liquid and pulverulent formulations with a low dispersant content to be prepared, these formulations having a multiplicity of advantageous characteristics.

The invention therefore also relates to compositions which are characterized in that they contain a finely divided dyestuff, the particle size of which is in general less than 5 μm and advantageously less than 3 μm, and an esterification product.

The compositions of disperse dyestuffs which have been disclosed hitherto still have a number of disadvantages which are not displayed by the dyestuff compositions according to the invention. Thus, conventional compositions of disperse dyestuffs, which contain anionic dispersants only, give rise to an undesired fall in the viscosity when printing pastes are stirred with synthetic thickeners. Usually, as the content of dispersants in the grinding or kneading paste increases, the viscosity of the composition also increases greatly, so that in unfavorable cases, in particular at somewhat elevated temperatures, the formulations become viscous or even solid. On the other hand, the proportion of the anionic dispersant cannot be reduced as desired, since otherwise frequently unstable dispersions, or dispersions which from the start are insufficiently finely dispersed, are obtained.

In dyehouses, for reasons of streamlining, the aim is for ever shorter liquor ratios in the dyebaths. Dyestuff formulations which are as highly concentrated as possible are preferred for the dyebaths. The high proportions of anionic dispersants in conventional disperse dyestuff preparations can result in undesired foaming in modern dyeing processes, such as in jet dyestuffing. Frequently, complaints are also made about severe dyestuff retention, in particular in the case of pad dyeings. In printing works, the high proportion of dispersants in conventional disperse dyestuff preparations not only gives rise to the adverse effect on the viscosity of the printing pastes, which has already been mentioned, but also necessitates time-consuming washing of the prints.

The invention now enables colorant preparations to be prepared which are not subject to the said restrictions and are particularly suitable for a number of special applications. Thus, aqueous colorant dispersions according to the invention can be dried to give powders, without any loss of quality. Both the powders and the liquid formulations are outstandingly suitable for dyeing and printing very diverse materials.

Further preferred embodiments of the invention are explained in more detail in the text which follows, percentages being by weight unless indicated otherwise.

Preferably, esters of aliphatic, cycloaliphatic or aromatic carboxylic acids of up to 22 C atoms with ethylene oxide and/or propylene oxide adducts are employed, the proportion of the ethylene oxide and/or propylene oxide being such that good solubility of the end product in water is achieved. The cloud point is a measure of the solubility in water. Esterification products which in the form of a 4% strength solution in 4% strength sodium chloride solution have a cloud point of not below 80° C. and in particular not below 85° C. are preferred.

In addition to ethylene glycol and propylene glycol, it is also possible, for example, to etherify glycerol, butane-1,4-diol, neopentylglycol, pentane-1,5-diol, hexane-1,6-diol, hexane-2,5-diol, 1,1,1-trimethylolpropane or other hexanetriols, cyclohexane-1,4-diol, pentaerythritol, sorbitol or hexitol with ethylene oxide and/or propylene oxide and then to esterify the reaction products.

Preferred compositions contain 5–90 and in particular 10 to 80% of dyestuff, 2–30 and in particular 2 to 15% esterification product, up to 20, and in particular up to 10% of anionic dispersants and up to 70% of water and/or water retention agents. In addition, the compositions according to the invention can contain assistants customary in such preparations, for example hygroscopic agents, anti-foams, anti-dusts or preservatives. If these preparations contain further assistants customary in such formulations, these assistants can be added before, during or after dispersion of the dyestuffs.

If the preparations according to the invention contain anionic dispersants, the dispersants employed are those customarily used for this purpose. Condensation products of aromatic sulfonic acids and formaldehyde, especially condensation products of alkylnaphthalenesulfonic acids, in particular methylnaphthalenesulfonic acids, and formaldehyde, such as have been disclosed in German Patent Specification No. 2,442,514, are preferred. Condensation products of optionally substituted phenol with formaldehyde and sodium bisulfite and also alkali metal salts of ligninsulfonic acids are also suitable.

Compared with conventional dyestuff compositions, the preparations according to the invention are distinguished by a very low content of surface-active substances. The water-soluble esterification products to be used according to the invention are, moreover, distinguished by a good biodegradability, so that there is only a minimal load on the effluent.

Despite the small quantity of surface-active substances, and especially of anionic dispersants, used, preparations according to the invention are obtained which, with a very high dyestuff content, in a liquid formulation have good free-flowing properties and are stable on storage.

Because of the good compatibility with synthetic thickeners, the preparations can be used in printing inks for roller-printing with very "shallow" engravings, intense prints being obtained. Use in rotary film printing is also possible.

The preparations according to the invention can be produced by all known processes. To produce preparations of water-insoluble dyestuffs, the dyestuff or a mixture of dyestuffs is mixed with one or more of the said esterification products, and, optionally, an anionic dispersant and, optionally, other additives and the mixture is subjected to mechanical comminution. The sequence in which the components are added can also be changed. Mechanical comminution is preferably effected in kneaders, ball mills, dispergators, bead mills, sand mills or attrition mills. A filter test or a microscope can be used to determine when the desired state of fine division, with a particle size of, in general, about 5 μm and preferably <3 μm, has been reached. The preparations obtained in this way contain the dyestuffs in a stable, finely divided form.

The state of fine division is retained even after storing for several weeks, both at room temperature and also at 50° C., and is not impaired on exposure to low temperatures.

In order to produce a pulverulent preparation, aqueous preparations can be dried in a conventional manner, for example by means of spray-drying. The pulverulent preparations obtained in this way are readily re-dispersed by simply stirring into water or into binder solutions.

Because the content of surface-active substances, and especially of anionic dispersants, is low, no retarding effect arises when the dyestuff preparations according to the invention are used in dyebaths or printing pastes, and brilliant color shades are obtained. Moreover, in the case of direct printing, the subsequent wash which is required can be substantially shortened or, if low-body thickeners are used, can even be entirely dispensed with, without there being any noticeable impairment in the handle of the printed goods or any impairment in the brilliance and color shade. In this case, the pH value of the preparations is advantageously adjusted to about 6 to 8.

In a particularly preferred embodiment of the invention, dyestuffs are employed which, at atmospheric pressure, sublime at between 150° and 220° C., the sublimed dyestuff being at least 60% undecomposed, in particular disperse dyestuffs from the series of the monoazo or disazo, anthraquinone, quinophthalone, nitro, azomethine, naphthalenetetracarboxylic acid or benzoxanthene dyestuffs, or mixtures of such dyestuffs. The preparations obtained in this way are suitable for the preparation of printing inks for printing transfer papers for heat transfer printing.

In the examples which follow, percentages and parts are by weight unless indicated otherwise.

EXAMPLE 1

400 parts of the dry dyestuff of the formula (1)

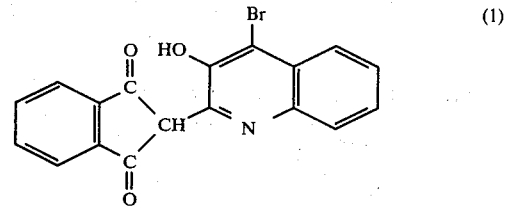

are ground, in a bead mill with siliquartzite beads, in a solution of 40 parts of the acetic acid diester of a propylene oxide/ethylene oxide block polymer with an average molecular weight of 8,500 and an ethylene oxide content of 80% (hereinafter termed "non-ionic dispersant I") and 20 parts of the dispersant disclosed in Example D of German Patent Specification No. 2,442,514 (hereinafter termed "anionic dispersant A"), 150 parts of ethylene glycol. 2 parts of chloroacetamide as a preservative and 300 parts of water. After 4 hours, a dispersion is obtained in which more than 90% of the particles are smaller than 3 μm. After adding 90 parts of water and separating off the beads, 1,000 parts of a paste which has good free-flowing properties and has a dyestuff content of 40% are obtained. The dispersion is stable on storage for several months at room temperature and at 50° C.

EXAMPLE 2

400 parts of the dry dyestuff of the formula (2)

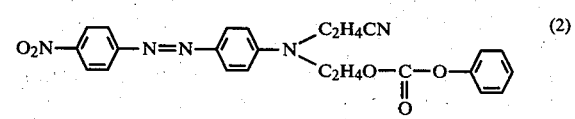

are ground for 7 hours, in a bead mill with siliquartzite beads, in a solution of 80 parts of the acetic acid diester of an ethylene oxide/propylene oxide block polymer with an average molecular weight of 7,500 and an ethylene oxide content of 68% (hereinafter termed "non-ionic dispersant II"), 15 parts of ligninsulfonate (hereinafter termed "anionic dispersant B"), 200 parts of ethylene glycol, 2 parts of Na pentachlorophenol as a preservative and 200 parts of water. After this time, a dispersion is obtained which has good free-flowing properties and in which more than 90% of the particles are smaller than 3 μm. The paste formulation is made up to 1,000 parts with water and the beads are filtered off. The preparation, which contains 40% of dyestuff, is stable on storage for several months at room temperature and at 50° C.

If the dyestuffs and dispersants indicated in the tables which follow are used in place of the components named in Example 2, and in other respects the procedure is analogous to Example 2, free-flowing paste formulations which are stable on storage again result.

(a) The dyestuffs (3), (4), (5), (6), (7), (8), (9), (10), (11), (12), (13), (14), (15), (16), (17)

(b) Non-ionic dispersants:
  III. Acetic acid diester of a pentaerythritol oxpropylate reacted with ethylene oxide; end product: ethylene oxide content 80%, molecular weight about 25,000
  IV. Formic acid diester of an ethylene oxide/propylene oxide block polymer (molecular weight about 9,000) with an ethylene oxide content of 80%
  V. Oleic acid diester of an ethylene oxide/propylene oxide block polymer (molecular weight about 8,000) with an ethylene oxide content of 80%
  VI. Stearic acid diester of a pentaerythritol oxpropylate reacted with ethylene oxide; end product: ethylene oxide content 80%, molecular weight about 25,000
  VII. Acetic acid diester of an ethylene oxide/propylene oxide block polymer (molecular weight about 13,500) with an ethylene oxide content of 80%

(c) Anionic dispersants
  Dispersant C is a sulfosuccinic acid half-ester of an oxethylated condensation product of nonylphenol and formaldehyde (German Patent Specification No. 2,132,403, Example B),
  Dispersant D is a condensation product of cresol, the sodium salt of 2-hydroxy-naphthalene-6-sulfonic acid ("Schäffer's salt"), formaldehyde and sodium bisulfite.

| Example | Dyestuff Parts | No. | Non-ionic dispersant Parts | No. | Anionic dispersant Parts | No. | Grinding time (hours) | Ethylene glycol Parts |
|---|---|---|---|---|---|---|---|---|
| 3 | 450 | 3 | 80 | IV | 5 | B | 4 | 150 |
| 4 | 300 | 6 | 80 | I | 20 | A | 5 | 200 |
| 5 | 350 | 8 | 100 | I | 20 | A | 4 | 200 |
| 6 | 300 | 7 | 80 | I | 20 | A | 5 | 250 |
| 7 | 400 | 11 | 80 | III | 15 | D | 5 | 100 |
| 8 | 350 | 13 | 100 | III | 20 | C | 7 | 200 |
| 9 | 400 | 5 | 60 | IV | 20 | C | 5 | 200 |
| 10 | 350 | 15 | 80 | I | 40 | D | 2 | 200 |

| Example | Dyestuff Parts | No. | Non-ionic dispersant Parts | No. | Anionic dispersant Parts | No. | Grinding time (hours) | Ethylene glycol Parts |
|---|---|---|---|---|---|---|---|---|
| 11 | 300 | 9 | 80 | II | 20 | B | 5 | 250 |
| 12 | 350 | 10 | 100 | II | 20 | B | 4 | 200 |
| 13 | 450 | 11 | 80 | IV | 30 | D | 5 | 100 |
| 14 | 400 | 4 | 80 | I | 20 | A | 5 | 100 |
| 15 | 350 | 4 | 100 | III | 15 | D | 6 | 120 |
| 16 | 450 | 12 | 100 | I | — | — | 5 | 100 |
| 17 | 400 | 12 | 80 | III | — | — | 6 | 100 |
| 18 | 400 | 1 | 100 | I | — | — | 5 | 200 |
| 19 | 400 | 11 | 100 | I | — | — | 5 | 200 |
| 20 | 300 | 14 | 100 | VII | 20 | A | 7 | 200 |
| 21 | 300 | 16 | 80 | I | 20 | A | 4 | 100 |
| 22 | 250 | 17 | 100 | I | 25 | B | 6 | 150 |
| 23 | 350 | 11 | 80 | V | 20 | A | 5 | 100 |
| 24 | 400 | 12 | 70 | VI | 10 | B | 6 | 100 |
| 25 | 350 | 5 | 100 | V | 20 | B | 5 | 200 |
| 26 | 300 | 3 | 80 | VI | 15 | C | 5 | 200 |

EXAMPLE 27

593 parts of a moist presscake of the dyestuff of the formula (13) with a solids content of 27% are ground in a bead mill with 200 parts of an aqueous solution containing 30 parts of the non-ionic dispersant I. After a grinding time of 4 hours, a further 167 parts of the aqueous solution, containing 25 parts of non-ionic dispersant I, are added and the mixture is ground in the bead mill for a further 30 minutes. The ground paste is separated off from the beads and spray-dried using a spray-drier at an inlet temperature of 160°–180° C. and an outlet temperature of 70°–80° C. A free-flowing powder with a dyestuff content of 75% is obtained and this can be dispersed readily, by stirring, in a printing thickener, an aqueous dyebath or a padding liquor.

EXAMPLE 28

355 parts of a moist presscake of the dyestuff of the formula (12) with a solids content of 45% are ground in a bead mill with 125 parts of an aqueous solution containing 25 parts of the non-ionic dispersant III and 15 parts of dispersant D. After a grinding time of 5 hours, the dispersion is separated off from the beads and spray-dried as in Example 27. A powder which has a dyestuff content of 80% and the advantageous characteristics mentioned in Example 27 results.

We claim:

1. A composition of matter comprising a water-soluble ester of the formula

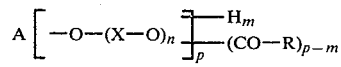

wherein A is the residue of an aliphatic or cycloaliphatic dihydric to hexahydric alcohol of 2 to 10 carbon atoms, the X's stand for the same or different groups of the formulae $$-CH_2-CH_2-$$

and $$-CH_2-CH(CH_3)-,$$

R—CO— is the acyl radical of a carboxylic acid having up to 22 carbon atoms, the n's stand for the numbers of 8 to 150, m is an integer of zero to 4, p is an integer of 2 to 6, with the proviso that p-m is at least 2, and a disperse or vat dyestuff.

2. A composition as claimed in claim 1, wherein A is a saturated hydrocarbon group of 2 to 6 carbon atoms, R—CO— is the acyl radical of an alkanoic or alkenoic acid, the molecular weight of the ester is 3,000 to 40,000, and the proportion of oxethyl groups in the group (X-O) is 40 to 95% by weight, referred to the total weight of the ester molecule.

3. A composition as claimed in claim 2, wherein the molecular weight of the ester is 6,000 to 30,000 and the proportion of oxethyl groups is 60 to 90%.

4. A composition as claimed in claim 2, wherein the molecular weight of the ester is 7,000 to 14,000 and the proportion of oxethyl groups is 65 to 85%.

5. A composition as claimed in claim 4, wherein the ester is the diester of a block polymer obtained by reacting ethylene oxide with polypropylene oxide.

6. A composition as claimed in claim 1, wherein the dyestuff has a particle size of below 5 μm.

7. A composition as claimed in claim 1, wherein the dyestuff has a particle size of less than 3 μm.

8. A composition as claimed in claim 1, wherein the dyestuff is capable of subliming at atmospheric pressure and a temperature of 150° to 220° C., the sublimed dyestuff being at least 60% undecomposed.

9. A composition as claimed in claim 1, consisting essentially of 5 to 90% by weight of dyestuff, 2 to 30% by weight of ester, up to 20% by weight of anionic dispersant and up to 70% by weight of water and/or adjuvants.

10. A composition as claimed in claim 1, consisting essentially of 10 to 80% by weight of dyestuff, 2 to 15% by weight of ester, up to 10% by weight of anionic dispersant and up to 70% by weight of water and/or a water-soluble polyhydric alcohol.

11. A composition as claimed in claim 1, wherein the dyestuff is dispersed in a liquid medium, and in which the ester is dissolved.

12. A pulverulent composition as claimed in claim 1, wherein the components are intimately mixed and the dyestuff is readily dispersible in a dyeing bath or a printing paste.

13. A composition as claimed in claim 1, consisting essentially of a disperse dyestuff of a particle size below 3 μm, the diacetate of a block polymer of propylene oxide and ethylene oxide with a content of oxethyl groups of 80% by weight, referred to the total ester molecule, and a molecular weight of 8,500.

* * * * *